United States Patent [19]

Aulds et al.

[11] Patent Number: 4,745,608
[45] Date of Patent: May 17, 1988

[54] LASER PHOTOGRAPHY PULSE SYNCHRONIZATION CIRCUIT

[75] Inventors: James M. Aulds, Oxford; Roger J. Becker, Kettering, both of Ohio

[73] Assignee: The United States of America as represented by the Secretary of the Air Force, Washington, D.C.

[21] Appl. No.: 879,717

[22] Filed: Jun. 27, 1986

[51] Int. Cl.$^4$ ............................................. H01S 3/00
[52] U.S. Cl. ........................................ 372/38; 372/29
[58] Field of Search ................. 372/38, 29, 33, 25, 372/56

[56] References Cited

U.S. PATENT DOCUMENTS

| | | | |
|---|---|---|---|
| 2,783,376 | 2/1957 | Hane | 250/27 |
| 3,366,439 | 1/1968 | Buck et al. | 352/84 |
| 3,643,568 | 2/1972 | Guillet et al. | 95/11.5 R |
| 3,671,112 | 6/1972 | Lennert et al. | 352/84 |
| 3,987,468 | 10/1976 | Matsuzaki et al. | 354/145 |
| 4,405,217 | 9/1983 | Brant | 352/84 |

OTHER PUBLICATIONS

Laird et al; Application of a Copper-Vapor Laser to High-Speed High Resolution, Front-Lit Cinephotography of Solid Propellant Deflagration; AIAA 21st Joint Propulsion Conf. Jul. 8-10, 85.

Primary Examiner—Leon Scott, Jr.
Attorney, Agent, or Firm—Gerald B. Hollins; Donald J. Singer

[57] ABSTRACT

A trigger circuit arrangement for controlling the operation of a metal vapor laser in conjuction with a high-speed motion picture camera. The disclosed circuit accommodates acceleration, deceleration, speed jitter, and the desired presence of marker images in the camera system while also accommodating temperature maintenance, double triggering prohibition, moderate trigger pulse energy requirements, and accurate synchronization requirements in the laser. The disclosed circuit employs conventional electronic components principally of the CMOS integrated circuit type, and utilizes magnetic transducer sensing of film transport movement.

19 Claims, 3 Drawing Sheets

LASER PHOTOGRAPHY PULSE SYNCHRONIZATION CIRCUIT

RIGHTS OF THE GOVERNMENT

The invention described herein may be manufactured and used by or for the Government of the United States for all governmental purposes without the payment of any royalty.

CROSS-REFERENCE TO RELATED APPLICATIONS

This application relates to the copending applications "High-Resolution Cinephotographic System", Ser. No. 879,726, "Proportional Drive Servo Controller with Array Position Detector", Ser. No. 879,718, "Optical Correlator for Analysis of Random Fields", Ser. No. 881,420, and "Chemical Inhibitor for Solid Propellants", Ser. No. 908,853, all except the latter of which are filed of even date herewith and are hereby incorporated by reference herein.

BACKGROUND OF THE INVENTION

This invention relates to the field of high-speed laser illuminated, shutterless photography wherein precise time positioning of laser light pulses with respect to the photographic film motion is important.

In the study of burn characteristics of solid state rocket grain or propellant, interesting conflicts occur and tradeoff compromises are required between the burning characteristics of the fuel grain and the properties of the apparatus employed to study the grain burn phenomenon. Generally one of these conflicts pits the limited depth of field of a photographic optics system against the rapid and irregular time progression of the grain burn surface. Another of these conflicts involves possible similarity between the color spectrum of the photographic illumination and the incandescent gases of the propellant sample combustion. An enabling improvement with respect to this second conflict, however, is found to reside in the use of a monochromatic laser light source and complementing filters during a photographic event—in order that the laser spectral energy be narrowly confined and usably segregated from the spectral bands present during combustion of the fuel grain. The ability to achieve reliable and accurate synchronization between the short duration laser illuminating pulses and the moving frames of the photographic film exposed with such lasers, is however, also a conflict area requiring some consideration in the achievement of quality burn face photography.

The metal vapor lasers which are preferred for generating monochromatic illumination of a fuel grain burn face -- such lasers as the copper-vapor laser, inherently add additional complexity to the execution of high-speed motion picture studies. In particular, the necessity of maintaining such lasers in continuous operation in order to achieve stable output energy levels and spectral content, together with the susceptibility of such lasers to double triggering short cycle operation requires detailed consideration in the assembly of a burn face photography system. Furthermore, in the arrangement of such photographic systems it is usually desirable to synchronize the light-supplying laser with the film motion in a master-slave relationship. This relationship is especially desirable where the slower, more inertia-prone photographic camera can be the master apparatus and the more flexible electronic circuit incorporating laser is arranged as the slave apparatus.

As evidenced by the following identifying patents, a considerable degree of inventive activity has been devoted to the satisfactory operation of high-speed photographic systems including such systems operating with the use of a pulsed laser illumination source.

Synchronization of a light source with the operation of a photographic camera system is found in the patent of A. E. Lennert et al, U.S. Pat. No. 3,671,112, which concerns an arrangement for applying a time reference scale to high-speed film in a high-pulse repetition rate environment. The Lennert et al patent is especially concerned with overcoming limitations encountered in using a neon lamp to expose timing reference marks on high-speed motion picture film. To this end, the patent addresses the problems of delay line capacitance, neon gas ionization times, and the transmission of signals through unterminated transmission line segments. In resolving the noted difficulties with neon lamp exposure of film, the Lennert et al apparatus uses a small neon keep-alive current and employs characteristic impedance terminated transmission lines and drivers. The Lennert et al patent is, however, not concerned with synchronized operation of a laser device nor with the constant temperature self-heat requirements of laser equipment.

Another prior patent concerned with illumination and photography is in the name of Hubert Guillet et al, U.S. Pat. No. 3,643,568. The Guillet et al apparatus accomplishes synchronization of a photographic light-supplying laser with the film transport mechanism of a photographic camera by way of slaving the light-supplying laser and the camera both to a second low-powered laser. The high-powered light-supplying laser in the Guillet et al apparatus is triggered by light received from, for example, a small helium-neon laser, while movement of the camera is initiated in response to an electrical signal generated from light supplied by the same triggering helium-neon laser. The Guillet et al apparatus employs a plurality of mirrors, one rotating in nature, for communicating light signals to a photomultiplier tube and to the input surface of the high-powered laser. The Guillet et al apparatus also employs a micrometric screw apparatus for adjusting the time position of the laser generated energy bursts.

A film speed control apparatus for use in a high-speed motion picture camera is also shown in the patent of Gordon W. Brant, U.S. Pat. No. 4,405,217, which concerns a driving circuit and speed control arrangement for a prism type high-speed motion picture camera—a Hycam ® camera of the type shown in U.S. Pat. Nos. 3,523,722 and 3,259,448, in particular. The Brant apparatus concerns a silicon-controlled rectifier circuit capable of providing camera motor protection, smooth film starts, film damage protection, and other drive characteristic features. The Brant apparatus is however concerned with the synchronizing of laser pulses with film movement in the camera.

Another patent, U.S. Pat. No. 3,987,468 issued to Soichiro Matsuzaki et al, concerns flash synchronizing and flash enabling and disabling circuitry for use in a stationary camera of the 35 millimeter type. The Matsuzaki et al patent is also not concerned with laser illumination or high-speed motion picture photography.

A circuit suitable for use in exciting a Kerr cell employed as the shutter of a high-speed camera is disclosed in the patent of Wilbur A. Hane, U.S. Pat. No.

2,783,376. The Hane invention concerns a vacuum tube electronic circuit usable for providing the signals needed in switching a Kerr cell optical element between energy transmitting and blocking optical states.

The patent art also includes the patent of W. E. Buck et al, U.S. Pat. No. 3,366,439, which concerns a laser illumination and shuttering arrangement for high-speed photography. In the Buck et al patent, an argon gas pulsed laser is used in conjunction with a rotating mirror and a slitted stop plate for illuminating and photographing workpiece objects. The slitted stop plate in the Buck et al invention provides improved rise and fall times for the workpiece illumination. The Buck et al apparatus also contemplates photographic recording of a self-luminous event and employs monochromatic laser illumination with filters for suppressing the non-laser illumination.

These patent references indicate the combination of electronic circuitry, high-speed motion picture cameras, and laser illumination sources to be desirable. Nevertheless, the examples provided by the above patents have been unable to achieve an optimum laser-to-camera synchronization system which also accommodates certain laser operating peculiarities.

SUMMARY OF THE INVENTION

In the present invention, triggering of a laser light source for a high-speed photographic system is initiated by periodic movement of a mechanical element in a high-speed camera—an element such as a film sprocket. According to this arrangement, the laser light source is made dependent upon or slaved to the occurrence of mechanical motion events notwithstanding the expected variation in timing between successive mechanical motion events. In the present invention, provision is also made for the transfer of laser triggering to a keep-alive pulse source both prior to and succeeding a filming event.

It is therefore an object of the present invention to provide a laser pulse synchronization circuit that is responsive to the speed and phase variations encountered in a mechanical apparatus motion picture camera.

It is also an object of the present invention to provide a keep-alive source of laser-triggering pulses which may be employed prior to and succeeding a laser illuminated camera filming operation.

It is another object of the invention to provide an electronic circuit wherein the transfer between keep-alive and camera-originated synchronization pulses is accomplished according to a predetermined arrangement, automatically and in response to the operating speed of the camera mechanical apparatus.

It is another object of the invention to provide a frequency hysteresis characteristic wherein competition between the laser keep-alive pulse source and the camera-derived source of pulses is nonexistent.

It is another object of the invention to provide a high-speed photography synchronization arrangement which can be conveniently embodied through the use of commercially-available integrated electronic circuits.

Additional objects and features of the invention will be understood from the following description and the accompanying drawings.

These and other objects are achieved by a laser keep-alive and triggering control apparatus for maintaining laser operation temperatures and slaving the occurrence of laser output pulses to a speed-variable repetitive-cycle master apparatus including a pulse triggered laser, first pulse sourcing means including a free-running electronic oscillator circuit for generating first electrical pulses capable of triggering bursts of optical energy from said laser, second pulse sourcing means including a signal pickup transducer responsive to cycle events within said speed variable master apparatus for generating second electrical pulses also capable of triggering bursts of optical energy from said laser, electronic switching means responsive to the rate of said second pulse sourcing means for commutating one of said first and second series of electrical pulses to said laser, means for inhibiting premature first and second pulses and resultant short cycle triggering of said laser following first pulse to second pulse and second pulse to first pulse triggering commutations in said switching means.

DETAILED DESCRIPTION

Figure 1:
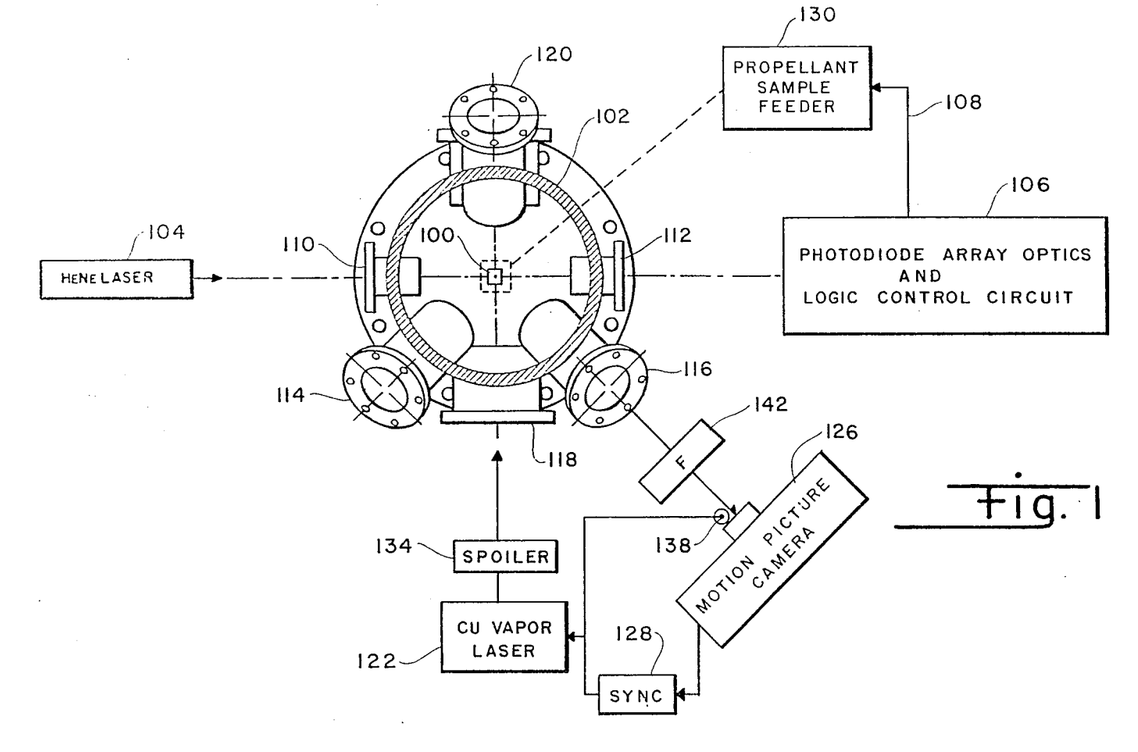
FIG. 1 is a top view and block diagram of a rocket propellant combustion photographic apparatus according to the present invention.

In FIG. 1 of the drawings there is shown a symbolic block diagram of an apparatus useful in photographing the dynamic behavior of a rocket propellant sample burn face for the study of propellant particle behavior, propellant composition variation effects and the burning characteristics of propellants. The FIG. 1 apparatus includes a pressurizable vessel 102 which is shown in top-viewed, cross-sectional form in FIG. 1, and is shown in greater detail in the above referred-to copending patent application "High-Resolution Cinephotographic System".

In the FIG. 1 apparatus, a sample of solid rocket propellant 100 is received by way of a pressure-tight lower opening into the vessel 102. During burning of an end surface portion of this sample the burning face is illuminated by a selected light source such as the copper-vapor laser 122, and is viewed by motion picture camera 126. The location of the burning surface of the rocket propellant sample 100 is precisely controlled as to elevation, that is, height above the lower closure of the vessel 102 and the plane of the FIG. 1 drawing, by means of an optical-electronic-mechanical control system. This system includes a light source such as the helium-neon laser 104, a photodiode array optics and logic control circuit apparatus 106, and the propellant sample feeder 130. Additional details of the electronic, optical, and electromechanical apparatus of the propellant sample level control system are disclosed in the patent application "Proportional Drive Servo Controller with Arrayed Position Detector". In the apparatus 106 the shadow or silhouette of the propellant sample resulting from illumination by the laser 104 is used to control the sample feeder 130 by way of electrical signals provided along the path 108.

The pressurizable vessel 102 includes a plurality of pressure sealed optical ports 110, 112, 114, 116, 118, and 120 used in admitting and exiting signals for the propellant sample feeder, for viewing the sample surface by the motion picture cameras, and for illuminating the sample surface by the laser 122 and for human viewing of the sample surface, respectively. Additional details regarding the pressure vessel 102 are presented in the above identified titled "High Resolution Cinephotographic System patent application.

As is also explained in greater detail in this same application, the FIG. 1 apparatus permits illumination of the propellant sample burn face by a monochromatic light source, the copper-vapor laser 122, using pulses of high intensity optical energy that are brief in time duration and by way of the spoiler 134 non-coherent in nature. With this controlled illumination, disturbances on the propellant burn face become viewable as real-time events on film that is moving through the camera 126. In such a photographic system, the camera 126 does not include mechanical shutter mechanisms of the type normally employed to allow movement of film between exposure frames. In lieu of such a shutter, short duration light pulses from the laser 122 provide the most significant light viewed by the camera 126 (in view of the filter 142) and by way of being of this short time duration effectively perform the function of a camera shutter. In view of this use of short duration laser optical energy pulses as a camera shutter, a need arises to synchronize the occurrence of laser energy pulses with film movement in the camera 126. Such synchronization is provided by the apparatus represented at 128 in FIG. 1, and shown in greater detail in FIGS. 2 and 3 of the drawings. The synchronization apparatus 128 in FIG. 1 also can be used to drive an optical source 138 which is used to exposed reference marks on the film in the camera 126, as is explained in greater detail in connection with the LED embodiment 208 of this source shown in FIG. 2.

Figure 2:
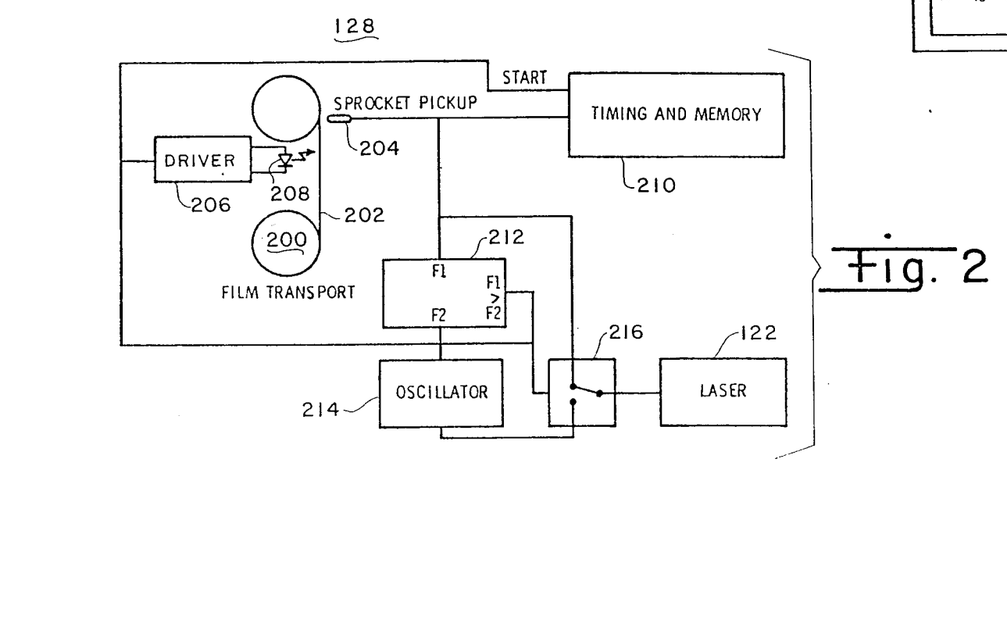
FIG. 2 is a block diagram of a synchronization apparatus usable in the FIG. 1 apparatus.

FIG. 2 of the drawings shows a block diagram of a synchronization apparatus usable at 128 in FIG. 1. The FIG. 2 apparatus includes a film transport 200 which moves a web of exposable photographic film 202 at a suitable velocity before a camera optical system which is not shown. Motion of the film 202 within the transport 200 is, of course, subject to the usual real-world characteristics of finite acceleration and deceleration times, movement jitter or variation and relatively short film length. Notwithstanding these real-world characteristics, it is desirable for the light pulse provided by the laser 122 to occur in identical film position locations for each exposure frame of the film, since variations between laser pulse occurrence and film location will provide exposures which are not matched to the center of the camera frame and will therefore be impossible to interpret when the exposed film is played back as a motion picture.

In addition, the thermal characteristics of the laser 122 which in the present apparatus is preferably a copper-vapor laser, dictate that the laser must be operated for some time prior to making a film exposure and be continued in operation during camera unloading and reloading, when additional film exposure is to be accomplished in order that predictable and stable levels of optical energy be delivered. This combination of camera and laser characteristics is accommodated in the present apparatus by way of triggering the laser 122 from a selected one of two possible triggering sources.

The first of these triggering sources, the timing and memory apparatus 210, is actuated by signals derived from a signal source such as the sprocket pickup transducer 204 that is associated with the film transport 200; the second of these trigger sources is the electronic oscillator circuit 214. Switching between these two sources of laser triggering pulses is accomplished by an electronic switching apparatus 216 that is controlled by a flip-flop multivibrator circuit arrangement 212.

In addition to the principal concept of synchronizing laser operation with movement of film in the transport 200, it is found desirable in interpretation of the moving pictures provided by the FIG. 1 and FIG. 2 apparatus to include a visual marker provided by the light source 208 which was shown at 138 in FIG. 1 and which may be a light emitting diode, for example, that is driven by the driver 206.

Figure 3:
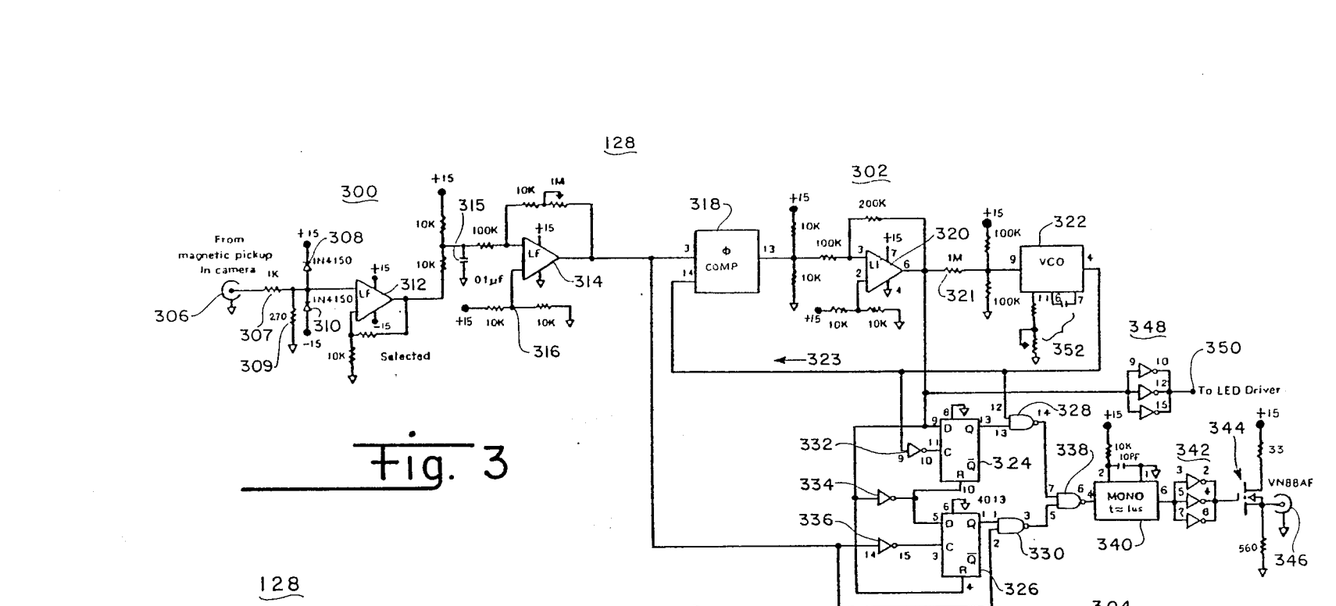
FIG. 3 is an electrical schematic diagram of a circuit usable to embody the FIG. 2 synchronization apparatus.

FIG. 3 of the drawings is an electrical schematic diagram showing details of an embodiment of the FIG. 2 synchronization apparatus. The FIG. 3 circuitry includes generally an input circuit portion 300, an oscillator and oscillator control portion 302, and a selecting and driving portion 304. In the input circuit portion 300, a signal from the magnetic transducer sprocket pickup 204 is received at the terminal 306 and conducted by way of the divider resistors 307 and 309 to the positive input terminal of the operational amplifier 312. A pair of electrical diodes 308 and 310 connected to ±15 volt power sources limit the amount of signal voltage swing that can occur at the input terminal of the amplifier 312.

The output of the operational amplifier 312 is connected to a second operational amplifier 314 which is arranged to act as a comparator circuit, that is, to provide a binary output signal of one predetermined level when signal received from the amplifier 312 exceeds the reference signal generated at the node 316. The higher frequency response or bandpass of the comparator circuit 314 is limited by the capacitor 315 to attenuate transient noise signals present in the output of amplifier 312. The binary output of the comparator 314 comprises a signal responsive to acceleration, deceleration, and jitter speed variations of the film 202 in the transport 200. This signal therefore comprises a major component of the triggering signal desired for the laser 122 in operating the FIG. 1 apparatus.

Another component of the signal desired for operating the laser 122 originates in the oscillator and oscillator control portion 302 of the FIG. 3 apparatus. The oscillator and oscillator control portion 302 includes a voltage controlled oscillator 322 which is frequency responsive to the output of a second comparator circuit 320 that is in turn driven by a phase comparator circuit 318. As is additionally described below, the voltage controlled oscillator 322 provides a local oscillator output signal which is shifted in frequency by the binary signals appearing at the output of the first comparator 314 during operation of the film transport 200.

In the free-running mode of operation, a feedback signal from the voltage controlled oscillator output is communicated along the path 323 to the input of the phase comparator circuit 318 for comparison with the signals arriving from the binary comparator circuit 314. In the absence of signals from the comparator circuit 314, the voltage controlled oscillator 322 and the resistor networks attending the circuits 318 and 320 are so arranged that the voltage controlled oscillator 322 operates in a free-running mode wherein the frequency generated is somewhat lower than the frequency expected during triggering by the transducer 204. The resistor 321 is principally effective in providing this higher output frequency from the oscillator 322 in the absence of pulses from the comparator circuit 314.

It is found convenient to embody the phase comparator circuit 318 and the voltage controlled oscillator 322 using a commercially available integrated circuit of the type identified as a CD4046A or an equivalent thereof. Circuits of this type are manufactured by RCA Corporation, and by a number of other integrated circuit manufacturers. The RCA version of this circuit is known variously as a CD4046AD, CD4046AK, CD4046AE, CD4046AH, depending on the type of packaging employed, and is a COS/MOS micropower phase-locked loop device. This circuit is described in a technical data sheet for the CD4046 circuits published by RCA Corporation and identified as file number 637 dated May 1973, which is hereby incorporated by reference herein.

Additional information regarding phase-locked-loop circuits, especially the RCA CD4046 circuit, is to be found in an RCA Corporation application note identified as ICAN-6101 authored by David K. Morgan, and dated November 1973, and published by RCA Corporation, which is also hereby incorporated herein by reference. Additional information regarding phase-locked techniques is to be found in the book *Phase Lock Techniques*, by F. Gardner, published in 1966 by John Wiley and Sons of New York, NY and in the article "Miniaturized RC Filters Using Phase-Locked-Loop" published by G. F. Moschytz, and appearing in the Bell System Technical Journal of May 1965. The Gardner and Moschytz articles are also hereby incorporated by reference herein.

The output signal from the voltage controlled oscillator 322 in FIG. 3 therefore assumes one of two possible operating frequency modes. In these operating modes, the voltage controlled oscillator 322 has an output frequency determined by the connected electrical components, that is, by the network 352 and the two 100K resistors in the voltage divider at the input terminal #9 -- with the 1 Meg input terminal connected resistor adding current for frequency change as determined by the output of comparator 320. The lower oscillator frequency is selected to be lower than the 5 kHz sprocket determined operating frequency of the film transport pulses by some predetermined amount such as 200 Hz in order that a band of frequency hysteresis be established and frequency hunting or indecision in the selecting and driving portion 304 of the FIG. 3 apparatus be avoided.

More specifically, if the frequency of the sprocket pickup signal is lower than the frequency of the local oscillator, then the local oscillator provides the higher frequency ($F_H$) of its two output signals. If, however, the sprocket frequency is higher than the local oscillator frequency, then the local oscillator shifts to a lower output frequency ($F_L$). This frequency shift hysteresis eliminates a tendency for the system to shift back and forth between sprocket pickup and local oscillator signals when the two frequencies are nearly equal or in response to noise transients. The laser, in this arrangement, is triggered by the higher frequency source, therefore with no film motion, the laser is triggered from the local oscillator at $F_H$ and when the sprocket pickup frequency is greater than $F_H$ the local oscillator is frequency shifted to $F_L$ and the laser is triggered from the sprocket pickup. When the camera has slowed toward shutdown and the sprocket frequency is less than $F_L$, the current local oscillator frequency, the local oscillator frequency is shifted back to $F_H$ and the laser is triggered from the local oscillator.

Switching between the supplying of laser trigger pulses from the sprocket pickup 204 and from the voltage controlled oscillator 322 occurs in the logic gates 328, 330 and 338, depending upon the output signals from the two flip-flop multivibrators 324 and 326. The flip-flop multivibrators 324 and 326 provide short-term memory storage and are actuated by the pulse output of the voltage controlled oscillator 322, the pulse output of the second comparator 320, and the pulse output of the first comparator 314. The operation of these two flip-flop multivibrators is according to the waveforms shown in FIG. 4 of the drawings.

Figure 4:
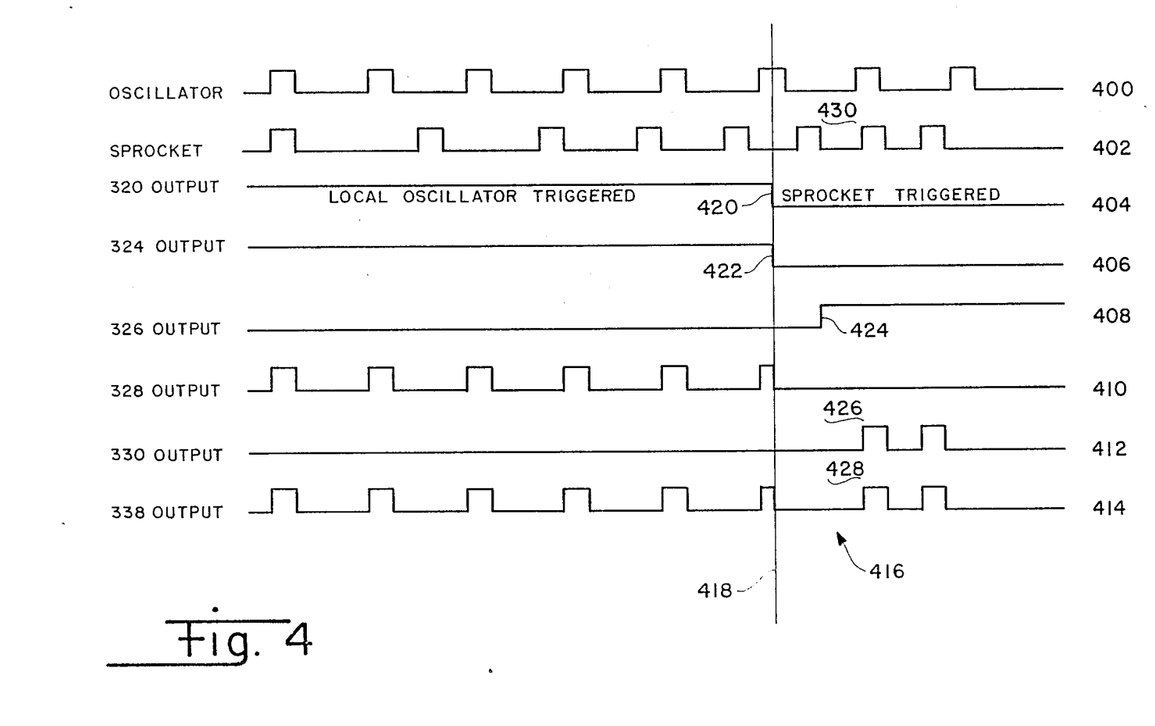
FIG. 4 is a group of signal waveforms which partly describe operation of the FIG. 3 circuit.

In FIG. 4 a typical oscillator output waveform is shown at 400 and a typical camera startup waveform is shown at 402; the pulses of the sprocket pickup signal can be observed to decrease in spacing from left to right in the waveform 402. The output of the comparator 320 is shown at 404 in FIG. 4 and the transition in this output which results from the sprocket pickup frequency reaching the local oscillator frequency is shown at 420. The Q outputs of the flip-flop multivibrators 324 and 326 are shown at 406 and 408 in FIG. 4, while the ANDing of these multivibrators with oscillator and sprocket pickup signals in the logic gates 328 and 330 is shown at 410 and 412. The "O"ed output of the gates 328 and 330 is shown at 410 in FIG. 4. This "OR"ed output from the gate 338 is the laser trigger signal, except for pulse duration, a characteristic controlled in the monostable multivibrator 340 to be about 1 microsecond in duration.

Generally the flip-flop multivibrators 324 and 326 change state when the laser triggering switches between local oscillator and sprocket pickup sources and vice versa. When the camera is started the frequency of the sprocket pickup ($F_p$) is as shown at 400 and 402 in FIG. 4 lower than that of the local oscillator ($F_0$) and the laser is therefore triggered from the local oscillator. When the sprocket frequency becomes greater than the local oscillator frequency, then the output of the comparator 320 changes from high to low as shown at 420 in FIG. 4. This transition resets the flip-flop multivibrator 324 and thereby terminates the flow of pulses from the gate 328.

During the following interval the laser is not triggered—as is shown at 416 in FIG. 4. This absence of triggering prevents undesirable transient triggering of the laser and a resulting lockup of the laser trigger circuit.

The high to low transition of the output from comparator 320 also enables a setting of the flip-flop multivibrator 326, an event which occurs on the falling edge of the next sprocket pickup pulse as shown at 424 and 430 in FIG. 4. Once the multivibrator 326 is set the gate 330 is enabled and sprocket pulses begin triggering the laser as shown at 426 and 428 in FIG. 4.

The switching between electrical component determined voltage controlled oscillator signals (local oscillator signals) for driving the laser 122 therefore occurs in dependence upon the frequency of pulses originating with the film transport 200. After film motion commences, once the film transport pulses accelerate up to the speed of the voltage controlled oscillator, the triggering for the laser 122 is switched from control by the voltage controlled oscillator to control by the film transport sprocket pickup 204. In the FIG. 3 apparatus, this switching includes an omission of one trigger pulse in order that the possibility of premature or double triggering of the laser 122 be avoided. Similarly, in switching from triggering controlled by the film transport 200 back to triggering control by components connected to the voltage controlled oscillator 322, as occurs for example, at the termination of a filming sequence, a similar omission of the first trigger pulse is accomplished in the FIG. 3 arrangement of the flip-flops 324 and 326.

The pulse output of the logic gate 338 therefore comprises the selected one of the laser triggering sources and includes the omission of first triggering pulse after commutation between triggering sources. The duration of the pulse emanating from the logic gate 338 is stretched to a predetermined length of about 1 microsecond, suitable for acceptance in the triggering circuit of the laser 122 by the action of the monostable multivibrator 340.

As indicated in the above incorporated-by-reference copending patent applications, the laser 122 is preferably a copper-vapor laser of the Model Number 151, which is manufactured by Plasma Kinetics, Inc. Triggering of this laser is accomplished by a minimum input pulse of 10 volts, and 500 nanoseconds time duration with less than 50 nanoseconds rise and fall times. Signals of this magnitude are provided from the FIG. 3 circuit through the use of an output power field effect transistor 344 which may be embodied, for example, as a VN88 transistor manufactured by Siliconex Corporation. The pulse for triggering the laser 122 is coupled through the jack 346 from the source terminal of the field effect transistor 344. The field effect transistor 344 is thereby operated in a source follower or current amplifying mode. A signal capable of driving the input gate of such a power field effect transistor is provided by the parallel connection of three logic gates 342 which are driven by the output of the monostable multivibrator 340 in FIG. 3.

In the input circuit portion 300 in FIG. 3, the diodes 308 and 310 may be of the 1N4150 commercial type, and the operational amplifiers 312 and 314 of the LF356 type, which are available from National Semiconductor Corp., while the various resistors and capacitors may have the indicated electrical value.

Signal for driving the LED light source 208 in FIG. 2 is provided by the parallel arrangement of three logic gates 348 which are driven from the output of the second comparator circuit 320. The LED light source 208 is energized when the FIG. 3 circuit switches to camera sprocket based laser triggering. The LED pulses indicate the instant of camera based triggering on the exposed film.

In the selecting and driving portion of the FIG. 3 circuitry, the flip-flop multivibrators 324 and 326 may be of the type 4013, manufactured by Motorola, Incorporated. While the inverter stages 332, 334, 336, 342 and 348 may be type 4049 logic gates and the logic gates 328, 330 and 338 may be types 4011 gates manufactured by Motorola, Incorporated. The monostable multivibrator 340 may be a type 4528 also manufactured by Motorola, Incorporated.

The described apparatus has therefore provided an arrangement for triggering the laser in a high-speed laser illuminated photography apparatus, a trigger arrangement which accommodates both the peculiarities of a practical film transport mechanism and the unusual characteristics of a high-energy monochromatic metal vapor laser such as a copper-vapor laser. The described apparatus is embodied using conventional electronic components and includes pulse skipping, frequency hysteresis and other features desirable for use with such lasers.

While the apparatus and method herein described constitute a preferred embodiment of the invention, it is to be understood that the invention is not limited to this precise form of apparatus or method, and that changes may be made therein without departing from the scope of the invention, which is defined in the appended claims.

We claim:

1. Laser keep alive and triggering control apparatus for initiating the generation of laser output pulses, maintaining laser operation temperatures, and slaving the occurrence of laser output pulses to a variable speed mechanical apparatus comprising:

a pulse triggered laser;

first pulse sourcing means including a free-running electronic oscillator circuit received therein, said sourcing means generating first electrical pulses capable of triggering operating temperature maintaining keep alive bursts of optical energy from said laser;

second pulse sourcing means including a signal pickup transducer responsive to predetermined movement events of said variable speed mechanical apparatus for generating second electrical pulses also capable of triggering bursts of optical energy from said laser;

electronic switching means responsive to a predetermined rate of said second pulse sourcing means for selecting one or the other of said first sourcing means and second sourcing means electrical pulses of said laser; and means for inhibiting premature first and second pulses and resultant short cycle triggering of said laser, following first pulse to second pulse and second pulse to first pulse triggering changes in said switching means.

2. The apparatus of claim 1 wherein said laser is a monochromatic spectrum laser.

3. The apparatus of claim 1 wherein said laser is a metal vapor laser.

4. The apparatus of claim 3 wherein said laser is a copper-vapor laser.

5. The apparatus of claim 1 further including means for changing the pulse rate of said electronic oscillator circuit to a rate below that of said second pulse sourcing means during triggering of said laser by said second pulse sourcing means.

6. The apparatus of claim 5 wherein said electronic oscillator circuit operates, in response to said means for changing, at a pulse rate between zero and five percent below the rate of said first pulse sourcing means.

7. The apparatus of claim 6 wherein said mechanical apparatus is a motion picture camera.

8. The apparatus of claim 7 wherein said signal pickup transducer is a magnetic flux operated transducer magnetically coupled to a mechanically driven member in said camera.

9. The apparatus of claim 8 wherein said mechanical member is a film driving sprocket.

10. The apparatus of claim 8 wherein said electronic oscillator circuit includes phase detecting and voltage controlled oscillator circuits.

11. The apparatus of claim 1 wherein said means for inhibiting premature first and second pulses includes means for inhibiting the first trigger pulse originating in a newly communicated one of said first and second pulse sourcing means.

12. The method of controlling operation of a pulsed metal vapor laser light source for high-speed motion picture lighting comprising the steps of:
  exposing sequential frames of motion picture film to object reflected sequential pulses of laser output energy, said film being in continuous uninterrupted receipt of both pulse illuminited light images and non-pulse illuminated dark images from said object during said exposing;
  triggering said pulses of laser energy from a first laser operating temperature maintaining, keep alive, free-running source of periodic trigger pulses prior to and following said exposing;
  initiating said pulses of laser energy from a second film transport periodic source of trigger pulses during said exposing; and
  excluding premature partial periodic cycle triggering events from said laser following first source to second source and second source to first source transfers between said trigger pulse sources.

13. Synchronized laser apparatus comprising:
  an electrical pulse triggerable laser;
  a magnetic flux to electrical signal transducer element;
  an operational amplifier circuit of predetermined voltage gain having both an input signal terminal, connected to said transducer electrical signal, and an amplifier output signal terminal;
  bipolar signal amplitude limiting means connected to said amplifier input signal terminal;
  first level detector means for generating a first binary output signal in response to an input signal of predetermined amplitude from said amplifier output signal terminal;
  phase comparator means for comparing the frequency of said first binary signals with voltage controlled oscillator means laser keep alive, operating temperature maintaining, signals;
  second level detector means for generating a second binary output signal in response to an input signal of predetermined amplitude from said phase comparator means;
  said voltage controlled oscillator means generating local oscillator signals at a first predetermined frequency in response to one binary output level from said second level detector means and at a second frequency in response to the opposite binary output level from said second level detector means; and
  bistable multivibrator means for selecting one of said output signals as an electrical pulse triggering signal for said laser.

14. The apparatus of claim 13 further including monostable multivibrator means responsive to said selected output signal for triggering said laser with a triggering signal of predetermined time duration.

15. The apparatus of claim 14 wherein said bistable multivibrator means includes a plurality of bistable multivibrator circuits.

16. The apparatus of claim 15 wherein said multivibrator means includes means responsive to the output signal of said first level detector means for selecting the higher frequency one of said local oscillator and transducer electrical signals for triggering said monostable multivibrator means.

17. The apparatus of claim 16 further including means for decreasing the output signal of said voltage controlled oscillator during time intervals when said bistable multivibrator is triggered by said transducer electrical signal.

18. The apparatus of claim 17 further including a high-speed motion picture camera and wherein said transducer element is responsive to mechanical motion in said motion picture camera and wherein said laser is disposed to provide pulsed illumination for said motion picture camera.

19. The apparatus of claim 18 further including pulsed optical energy source means optically coupled to film in said camera and energized from said second level detector means for generating reference signals on said camera film.

* * * * *

UNITED STATES PATENT AND TRADEMARK OFFICE
CERTIFICATE OF CORRECTION

PATENT NO. : 4,745,608

DATED : May 17, 1988

INVENTOR(S) : James M. Aulds et al

It is certified that error appears in the above-identified patent and that said Letters Patent is hereby corrected as shown below:

Col 2, line 57, before "however" insert ----not---.

Col 5, line 4, insert ---"--- after "System".

Signed and Sealed this

Tenth Day of January, 1989

Attest:

DONALD J. QUIGG

Attesting Officer

Commissioner of Patents and Trademarks